United States Patent
Chickering et al.

(10) Patent No.: US 10,262,272 B2
(45) Date of Patent: Apr. 16, 2019

(54) ACTIVE MACHINE LEARNING

(71) Applicant: Microsoft Technology Licensing, LLC, Redmond, WA (US)

(72) Inventors: David Maxwell Chickering, Bellevue, WA (US); Christopher A. Meek, Kirkland, WA (US); Patrice Y. Simard, Clyde Hill, WA (US); Rishabh Krishnan Iyer, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 637 days.

(21) Appl. No.: 14/562,747

(22) Filed: Dec. 7, 2014

(65) Prior Publication Data

US 2016/0162802 A1 Jun. 9, 2016

(51) Int. Cl.
*G06N 20/00* (2019.01)

(52) U.S. Cl.
CPC .................................. *G06N 20/00* (2019.01)

(58) Field of Classification Search
None
See application file for complete search history.

(56) References Cited

U.S. PATENT DOCUMENTS

| | | |
|---|---|---|
| 8,086,549 B2 | 12/2011 | Qi et al. |
| 8,140,450 B2 | 3/2012 | Porikli et al. |
| 2010/0152878 A1* | 6/2010 | Chu ....................... G05B 17/02 700/110 |

OTHER PUBLICATIONS

Blog post "An Intuitive (and short) Explanation of Bayes' Theorem," downloaded from <betterexplained.com/articles/an-intuitive-and-short-explanation-of-bayes-theorem/> and verified online as of 2012 via web.archive.org, attached document from Jan. 3, 2012. 4 pp.*
Joshi, A. et al., "Coverage Optimized Active Learning for k-NN Classifiers," 2012 IEEE Conf. on Robotics and Automation (May 2012) pp. 5353-5358.*
Lan, L. et al., "An Active Learning Algorithm Based on Parzen Window Classification," AISTATS Workshop in Active Learning and Experimental Design (2010) pp. 99-112.*
Lindenbaum et al., "Selective Sampling for Nearest Neighbor Classifiers," Machne Learning, vol. 52 No. 2 (2004) pp. 125-152.*
McCallum, A. et al., "Employing EM and Pool-Based Active Learning for Text Classification," 15th Intl. Conf. on Machine Learning (1998) pp. 350-358.*

(Continued)

*Primary Examiner* — Kakali Chaki
*Assistant Examiner* — Brian M Smith
(74) *Attorney, Agent, or Firm* — Schwegman Lundberg & Woessner, P.A.

(57) ABSTRACT

Technologies are described herein for active machine learning. An active machine learning method can include initiating active machine learning through an active machine learning system configured to train an auxiliary machine learning model to produce at least one new labeled observation, refining a capacity of a target machine learning model based on the active machine learning, and retraining the auxiliary machine learning model with the at least one new labeled observation subsequent to refining the capacity of the target machine learning model. Additionally, the target machine learning model is a limited-capacity machine learning model according to the description provided herein.

20 Claims, 6 Drawing Sheets

(56) References Cited

OTHER PUBLICATIONS

Ando, R.K. et al., "Two-view feature generation model for semi-supervised learning," Proc. of the 24th Intl. Conf. on Machine Learning (2007) 8 pp.*

Blum, A. et al., "Combining labeled and unlabeled data with co-training," Proc. of the 11th Annual Conf. on Computational Learning Theory (1998) pp. 92-100.*

Zhang, L. et al, "A unified feature and instance selection framework using optimum experimental design," IEEE Trans. on Image Processing, vol. 21, No. 5 (May 2012) pp. 2379-2368.*

Davy, "A Review of Active Learning and Co-Training in Text Classification", Computer Science Technical Report TCD-CS-2005-64, retrieved on Feb. 9, 2016 at <<http://www.tara.tcd.ie/bitstream/handle/2262/13298/TSD-CS-2005-64.pdf?sequence=1&isAllowed=y>>, Machine Learning Group, Department of Computer Science, Trinity College Dublin, Nov. 4, 2005, pp. 1-39.

PCT Search Report and Written Opinion dated Feb. 22, 2016 for PCT Application PCT/US15/62853, 14 pages.

Raghavan, et al., "Active Learning with Feedback on Both Features and Instances", Journal of Machine Learning Research 7, retrieved on Feb. 9, 2016 at <<http://www.jmlr.org/papers/volume7/raghavan06a/raghavan06a.pdf>>, 2006, pp. 1655-1686.

Raghavan, et al., "InterActive Feature Selection", Proceedings of the 19th International Joint Conference on Artificial Intelligence (IJCAI'05), Dec. 31, 2005, pp. 841-846.

Wei, et al., "Submodular Subset Selection for Large-Scale Speech Training Data", IEEE International Conference on Acoustic, Speech and Signal Processing (ICASSP), IEEE, 2014, pp. 3311-3315.

Duan et al., "Domain Adaptation from Multiple Sources via Auxiliary Classifiers", Jun. 14, 2009, In Proceedings of the 26th Annual International Conference on Machine Learning, 8 pp.

Fang, et al., "Active Learning for Crowdsourcing Using Knowledge Transfer", Jul. 27, 2014, In Proceedings of the Twenty-Eighth AAAI Conference on Artificial Intelligence, pp. 1809-1815.

Fang et al., "Knowledge Transfer for Multi-Labeler Active Learning", Sep. 23, 2013, In Proceedings of European Conference on Machine Learning and Principles and Practice of Knowledge Discovery in Databases, 16 pp.

Iwata et al., "Improving Classifier Performance using Data with Different Taxonomies", Sep. 23, 2010, In proceedings of IEEE Transactions on Knowledge and Data Engineering, vol. 23, Issue 11, 11 pp.

Lu et al., "Source Free Transfer Learning for Text Classification", Jul. 27, 2014, In Twenty-Eighth AAAI Conference on Artificial Intelligence, 7 pp.

Nguyen, "Efficient Learning with Soft Label Information and Multiple Annotators", Mar. 24, 2014, In Doctoral Dissertation, 139 pp.

Settles, Burr "Active Learning Literature Survey" Jan. 26, 2010, Computer Sciencces Technical Report 1648, Univ. of Wisconsin-Madison, 67 PP.

Sun et al., "Active Learning for Relation Type Extension with Local and Global Data Views", Oct. 29, 2012, In Proceedings of the 21st ACM international conference on Information and knowledge Management, 9 pp.

Tao, "An SVM-Based Auxiliary Domain Method for Computing Structural Reliability", Jun. 30, 2014, In Proceedings of the 9th International Conference on Structural Dynamics, pp. 2989-2993.

Wallaceyz et al., "Active Learning for Biomedical Citation Screening", Jul. 25, 2010, In Proceedings of the 16th ACM SIGKDD international conference on Knowledge discovery and data mining, pp. 173-181.

Wang et al., "Querying Discriminative and Representative Samples for Batch Mode Active Learning", Aug. 11, 2013, In Proceedings of the 19th ACM SIGKDD international conference on Knowledge discovery and data mining, pp. 158-166.

Yang, , "Learning to Adapt Across Multimedia Domains", In Doctoral Dissertation, Nov. 19, 2007, 61 pages.

Zhu, et al., "Transfer Active Learning", Oct. 24, 2011, In Proceedings of the 20th ACM international conference on Information and knowledge management, pp. 2169-2172.

* cited by examiner

ACTIVE MACHINE LEARNING

BACKGROUND

Machine learning generally includes the construction or generation of machine learning algorithms that can learn from data. These algorithms are used to build a model based on features that is used to generate a classifier tuned to a particular purpose. Active machine learning is a discipline where a "teacher," such as a user, presents training examples to train a function to the model.

Historically, whether training examples were labeled or unlabeled has been based on the particular purpose. For example, in existing systems training examples for implementing a classifier tuned to classify documents about the subject of baseball typically include examples of documents labeled as relating to baseball and examples of documents labeled as not relating to baseball.

Other existing training examples were unlabeled. For example, unlabeled examples might or might not have been related to baseball. Accordingly, a third party such as the teacher must label existing unlabeled training examples so that the model has valuable input by which to learn an associated function.

In particular, active learning necessitates relatively high-quality labeled training examples such that the model can adequately learn the desired function for future classification of any number of unlabeled input documents. However, the discovery of high-quality labeled training examples amongst the virtually unlimited number of unlabeled documents available to the machine learning algorithm is typically costly. For example, many users are employed to interpret unlabeled documents to determine viability for machine learning purposes. However, if a particular model being trained by existing machine learning algorithms needs to be limited, the viability of each potential candidate for a labeled training example must be even more carefully considered, and costs can exceed desired targets.

SUMMARY

The techniques discussed herein facilitate active machine learning through utilization of an auxiliary machine learning model to incrementally feature a target machine learning model. The auxiliary machine learning model can be a machine learning model having a relatively large scope as compared to the target machine learning model.

The above-described subject matter can also be implemented as a computer-controlled apparatus, a computer process, a computing system, or as an article of manufacture such as a computer storage medium. This Summary is provided to introduce a selection of technologies in a simplified form that are further described below in the Detailed Description. This Summary is not intended to identify key features or essential features of the claimed subject matter, nor is it intended that this Summary be used to limit the scope of the claimed subject matter. The term "technologies," for instance, may refer to system(s), method(s), computer-readable media, computer-executable instructions, module(s), algorithms, hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), and/or technique(s) as permitted by the context described above and throughout the document. Furthermore, the claimed subject matter is not limited to examples that solve any or all disadvantages noted in any part of this disclosure.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
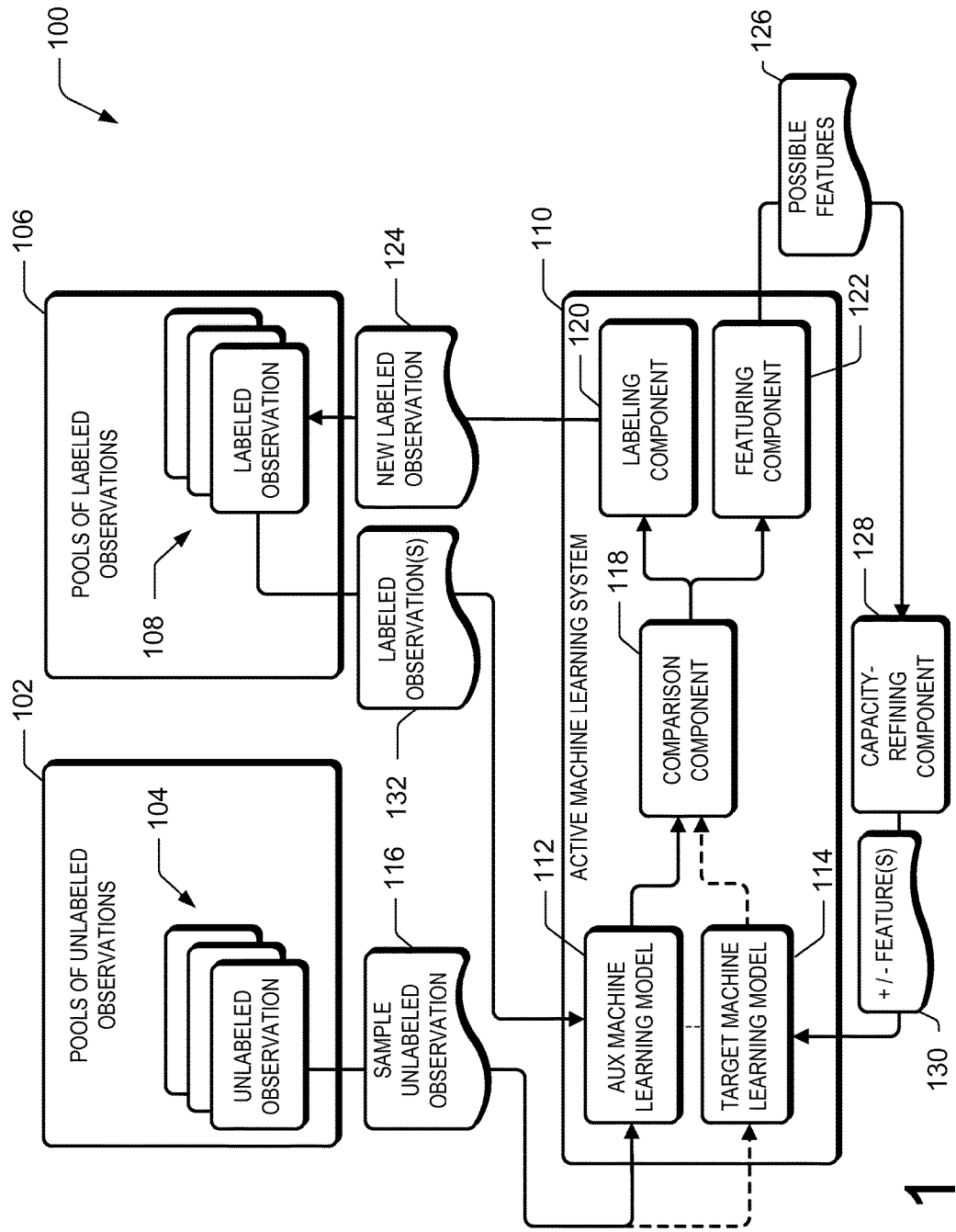
FIG. 1 is a diagram showing aspects of an illustrative operating environment and several components provided by the technologies described herein.

The following detailed description is directed to technologies for active machine learning that can be provided by a software product, or a set of software products. The technologies presented herein facilitate relatively accurate identification of high-quality training examples for an active machine learning algorithm, or an associated model. Furthermore, the technologies can increase efficiency in training limited-capacity models. Moreover, the technologies can facilitate incremental featuring for limited-capacity models to realize accurate and desirable outputs from classifiers created through the limited-capacity models.

As used herein, the phrase "limited-capacity model" and variations thereof refer to machine learning models that are limited or restricted in capacity. One example limited-capacity model is a machine learning model with a limited number of features. The features can include positive or negative features, however. Another example limited capacity model is a machine learning model in which a total number of n-grams being sought (e.g., words or tuples of words being sought in a document) is limited or restricted. Limited capacity models allow deployment of classifiers that are also limited in size, to realize gains in memory efficiency. Additionally, transmission of limited capacity models and/or classifiers that are also limited in size can reduce network traffic in mobile networks, for example, when transmitting the classifiers and/or models to mobile devices for deployment.

As used herein, the phrase "color-blindness" and variations thereof refer to a lack of ability of a target machine learning model to differentiate between separate or distinct observations despite those distinct observations being different in a defined manner. For example, a classifier trained on a target machine learning model may be "color-blind" to a distinction between a web-page describing a bird cage and a web-page describing a batting cage. However, the same classifier may not be "color-blind" to a distinction between an advertisement for a baseball bat and an advertisement related to a museum exhibit on winged bats.

As used herein, the phrase "diversity" and variations thereof refer to a set of observations having many differences between individual observations of the set. For example, a diversified set of observations includes diversity across many or all of the observations contained therein.

As mentioned briefly above, features are components of machine learning models as described herein. The term "features" and variations thereof refers to data included in a machine learning model. Examples of features include words, phrases, n-grams, and lexicographical data. Additionally, as used herein, the phrase "incremental featuring" and variations thereof refers specifically to the addition or removal of features from a target machine learning model in an incremental manner. In contrast, conventional machine learning techniques typically add a plurality of features or otherwise manipulate a machine learning model in a non-incremental manner.

Generally, the technologies described herein for active machine learning include the training of a target machine learning model through incremental featuring, and/or through refining the capacity of the target machine learning model, based on active machine learning of a second, auxiliary machine learning model. The auxiliary machine learning model can be of infinite capacity, or may have a relatively large capacity as compared to the target machine learning model. An active machine learning system can utilize the active machine learning of the auxiliary machine learning model to identify a scope of color-blindness of the target machine learning model. Thereafter, upon identification of the scope of color-blindness, new high-quality labeled training examples can be produced and used to determine features to add or remove from the target machine learning model. Color-blindness, a scope thereof, and other attributes of target machine learning models will be described more fully below with reference to the figures.

Implementation of diversity in the active machine learning of the auxiliary machine learning model can at least partly increase the efficiency of the technologies described herein. For example, an active machine learning system can select new unlabeled observations that are diverse across all selected unlabeled observations. In this manner, an active machine learning system can assemble a higher quality training set. The diversity can be implemented in many differing manners that are described more fully below with reference to FIG. 5.

As additionally discussed briefly above, a software product, or a set of software products, can provide some or all of the functionality described herein related to active machine learning. For example, a network service can be deployed through a service provider network (e.g., using an operating system and/or application programs). The network service can allow for third party use of the techniques described herein for training a limited capacity machine learning model based on active machine learning of an auxiliary machine learning model with a relatively large capacity. The network service can be deployed across one or more host processors, computers, servers, or other computer hardware, and can be provided over one or more network connections. Additionally, according to at least one example, knowledge related to the size and attributes of labeled training observations can be stored or retained at the service provider network. Accordingly, if desired, new classifiers can be built upon pre-labeled data with a cost buildup being reduced as compared to implementation of new classifiers from scratch.

While the subject matter described herein is presented in the general context of program modules that execute in conjunction with the execution of an operating system and application programs on a computer system, those skilled in the art will recognize that other examples can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with various computer system configurations, including single-processor or multiprocessor systems, single core or multi-core processors, microprocessor-based or programmable consumer electronics, hand-held computing devices, minicomputers, personal computers, mainframe computers, combinations thereof, and the like.

In the following detailed description, references are made to the accompanying drawings that form a part hereof, and which are shown by way of illustration specific examples or examples.

Example Environment

FIG. 1, shows aspects of an illustrative operating environment 100 including several components provided by the technologies described herein. The environment 100 of FIG. 1 includes one or more pools of unlabeled observations 102 having a plurality of unlabeled observations 104 disposed therein. The unlabeled observations 104 can alternatively be dispersed across many different pools or other devices/components not particularly illustrated in FIG. 1.

In machine learning, classification is the problem of identifying to which of a set of categories (e.g., sub-populations, classes, et cetera) a new observation belongs, on the basis of a training set of data containing observations whose category of membership is already known or labeled. Generally, an unlabeled observation 104 is an observation to which the particular category or class of membership is unknown. The classes can include any number of classes based on any desired attribute. For example, the classes can include "SPAM messages," "web-pages," "baseball documents," or any other class. Accordingly, the description provided herein should not be limited to a particular class or a particular type of class, but should be understood to encompass any suitable class or classification of observations.

The environment 100 includes one or more pools of labeled observations 106 having a plurality of labeled observations 108 disposed therein. The labeled observations 108 can alternatively be dispersed across many different pools 106 or other devices/components not particularly illustrated in FIG. 1 in a similar manner as described in relation to unlabeled observations 104.

Generally, a labeled observation is an observation to which the particular category or class of membership is known. The labeled observation can include metadata associated therewith particularly calling out an associated class, a binary representation of whether it belongs to the class (e.g., a "yes/no" flag), and/or other forms of labeled observations and storage of associated labels.

The environment 100 includes an active machine learning system 110 in operative communication with the pools of unlabeled observations 102 and the pools of labeled observations 106. Such active communication can occur over a network or other communication medium capable of facilitating communication and transfer of information between the active machine learning system 110 and the pools of unlabeled observations 102 and/or the pools of labeled observations 106.

The active machine learning system 110 can be implemented as one or more components, such as software modules executing on one or more processors, among one or more computers in some examples. In various examples, the active machine learning system 110 can be implemented as discrete components having both hardware and software associated therewith for performing some or all of the functionality described herein. Additionally, other examples include virtualization of the active machine learning system 110 on the service provider network described above, distribution of computer-executable instructions that are configured to direct a processor to implement the active machine learning system 110, and other suitable implementations.

The active machine learning system 110 can include both an auxiliary machine learning model 112 and a target machine learning model 114. The auxiliary machine learning model 112 can include any desired model having a relatively larger capacity than the target machine learning model 114. In at least one example, the auxiliary machine learning model 112 is a bag-of-words machine learning model, which uses the frequency of occurrence of each word of the bag-of-words as a feature for training a classifier. In some examples, the auxiliary machine learning model 112 is a semantic machine learning model or classifier similar to a bag-of-words model that can have an unrestricted or substantially unrestricted capacity of underlying features. Other examples of the auxiliary machine learning model 112 are possible. The target machine learning model 114 is a limited capacity model as defined hereinabove.

As shown in FIG. 1, an active learning routine configured for training of the auxiliary machine learning model 112 to learn a desired function selects a sample unlabeled observation 116. Thereafter, the auxiliary machine learning model 112 can produce an output for interpretation by a comparison component 118, labeling component 120, and featuring component 122. For example, the comparison component 118 can pass a score produced by the auxiliary machine learning model 112 to the labeling component 120 and the featuring component 122.

Upon receipt of the score, the labeling component 120 can convert the sample unlabeled observation 116 to a new labeled observation 124 based on the received score. The labeling component 120 can then cause the new labeled observation 124 to be stored in the pools of labeled observations 106 for training of the auxiliary machine learning model 112.

Additionally, upon receipt of the score the featuring component 122 can identify possible features 126 to be added or removed from the target machine learning model 114 based on the score. A capacity-refining component 128 can process possible features 126 to determine features 130 to be incrementally added or removed from the target machine learning model 114.

It should be understood that the capacity-refining component 128 can take any suitable form. According to at least one example, the capacity-refining component 128 includes a user-interface to accept input for selection of the features 130 from the possible features 126. According to other examples, the capacity-refining component 128 can include a methodology for automated selection of the features 130 from the possible features 126.

Additionally, the comparison component 118, the labeling component 120, and the featuring component 122 can be implemented in many different forms. The particular operation of each of the comparison component 118, the labeling component 120, and the featuring component 122 are described more fully with reference to FIGS. 2-4.

According to at least one example, the target machine learning model 114 can also receive the sample unlabeled observation 116 selected through the active machine learning of the auxiliary machine learning model 112. Thereafter, the target machine learning model 114 can produce a second score representative of processing of the sample unlabeled observation 116 such that the comparison component 118 can compare the first score from the auxiliary machine learning model 112 and the second score from the target machine learning model 114 to determine a probability that a false positive or false negative result, or an error, has been produced by the target machine learning model. Accordingly, the labeling component 120 and featuring component 122 can take the probability into consideration to produce better possible features 126 and to generate a quality new labeled observation 124.

Example Processes

Hereinafter, a more detailed description of functions of the active machine learning system 110 and associated components is provided with reference to FIGS. 2-4. Although described as occurring in sequence, it should be appreciated that any of the operations of the individual methods described below can be processed in parallel and some operations can be omitted under some circumstances without departing from the techniques described herein.

Figure 2:
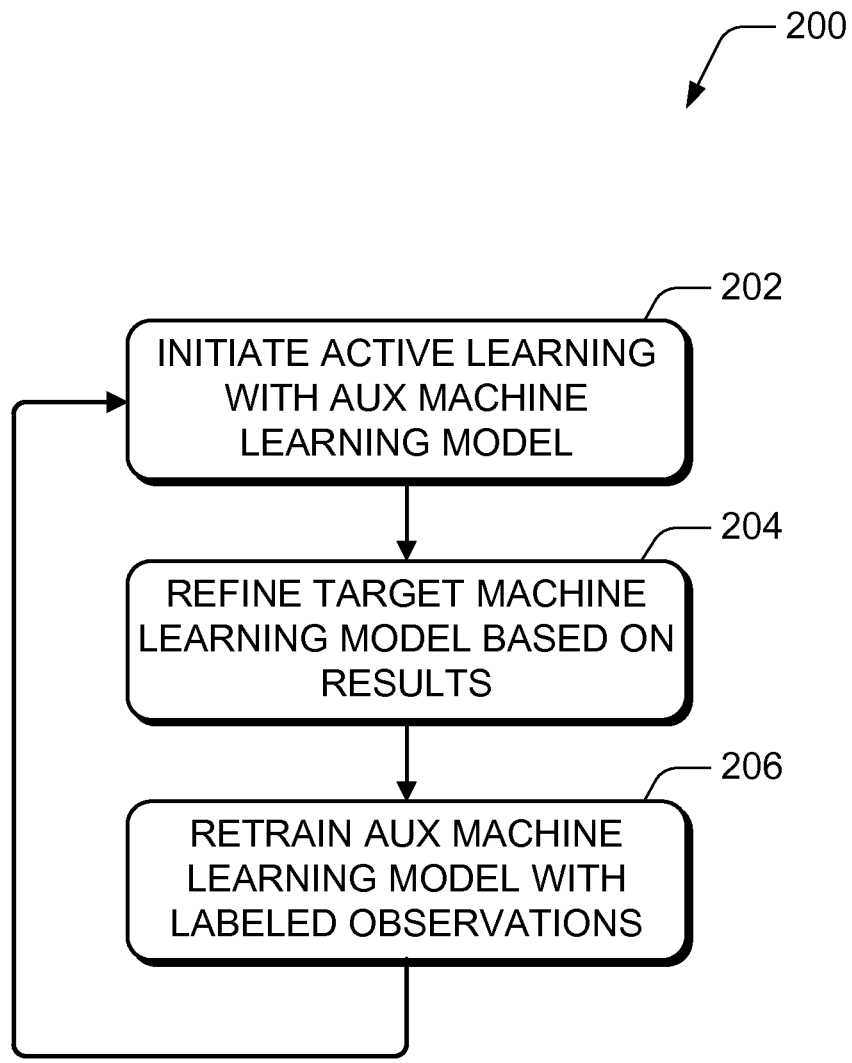
FIG. 2 is a flowchart showing aspects of one illustrative method for active machine learning as described herein.

FIG. 2 is a flowchart showing aspects of one illustrative method for active machine learning 200, according to at least one example. The method 200 of active machine learning can include initiating an active learning process with the auxiliary machine learning model 112, at block 202. For example, the active machine learning system 110 can direct the auxiliary machine learning model 112 to select one or more sample unlabeled observations 116 for processing and outputting a score. The featuring component 122 can process the score.

Thereafter, the featuring component 122 can refine the target machine learning model capacity based on the score, at block 204. For example, the featuring component 122 can determine, based on the score from the auxiliary machine learning model 112, that one or more possible features 126 should be added or removed from the target machine learning model, e.g., a highest score, lowest score, a score within a defined range, etc. Generally, the score indicates whether or not the sample unlabeled observation does or does not belong to a particular class. Accordingly, if the score indicates the unlabeled observation belongs to a class, one or more possible features 126 may be extracted from a labeled observation such as labeled observation 132 for training the target machine learning model to identify similar unlabeled observations as pertaining to the class. If the score indicates the unlabeled observation does not belong to a class, one or more possible features 126 may be extracted from the labeled observation 132 for training the target machine learning model to identify similar unlabeled observations as not pertaining to the class. Based on these possible features 126, the capacity-refining component 118 can refine the capacity of the target machine learning model 114 by incrementally adding or removing a feature 130 to/from the target machine learning model 114.

Upon refinement of the capacity of the target machine learning model 114, the method 200 further includes retraining the auxiliary machine learning model with labeled observations 132, at block 206. For example, the active machine learning system 110 can provide the newly labeled observation 124 and one or more labeled observations 132 from the pool of labeled observations 106 to retain or modify the auxiliary machine learning model 112. As the capacity of the auxiliary machine learning model 112 is not limited, retraining the auxiliary machine learning model 112 can increase the quality of a labeled training set for the target machine learning model 114 without affecting the capacity of the target machine learning model 114.

As shown in FIG. 2, the method 200 can iterate through blocks 202-206 to incrementally refine the capacity of the target machine learning model 114 and to retrain the auxiliary machine learning model 112 based on newly labeled observations 124. This incremental refinement allows for maintaining the limited-capacity of the target machine learning model 114 within desirable limits or restrictions. For example, it can be desirable to maintain a specific bound on the entire number of features included in the target machine learning model 114 to produce compact classifiers. In this instance, the method 200 can facilitate the compactness of the classifiers based on the incremental nature of adding and removing features of the target machine learning model 114.

The auxiliary machine learning model 112 selecting a diversified set of sample unlabeled observations 116 can result in higher-quality target machine learning models 114 and/or at least a partial gain in efficiency in training the target machine learning model 114. For example, a diversified set of observations can include diversity across many or all of the observations contained therein.

Figure 3:
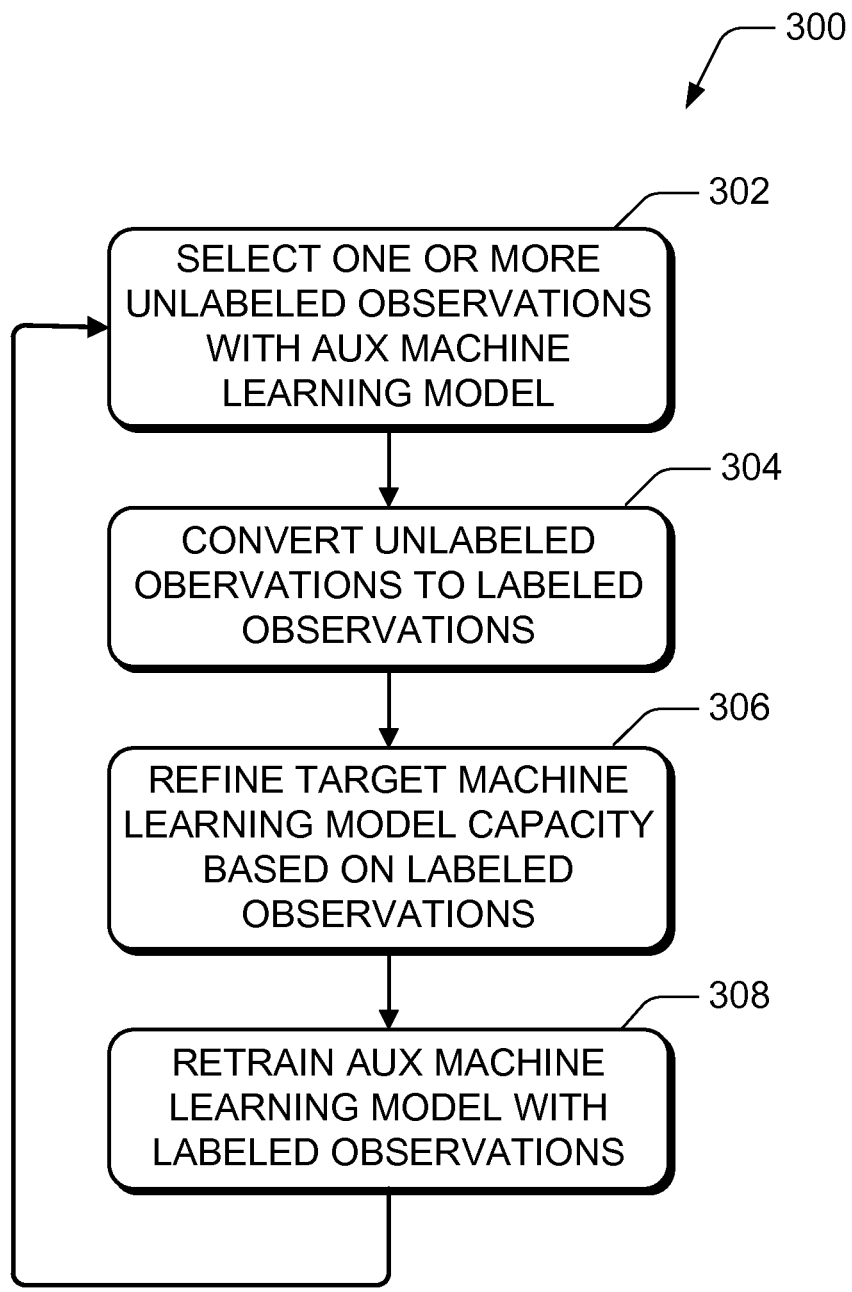
FIG. 3 is a flowchart showing aspects of one illustrative method for active machine learning including selection of unlabeled observations having diversity as described herein.
Figure 4:
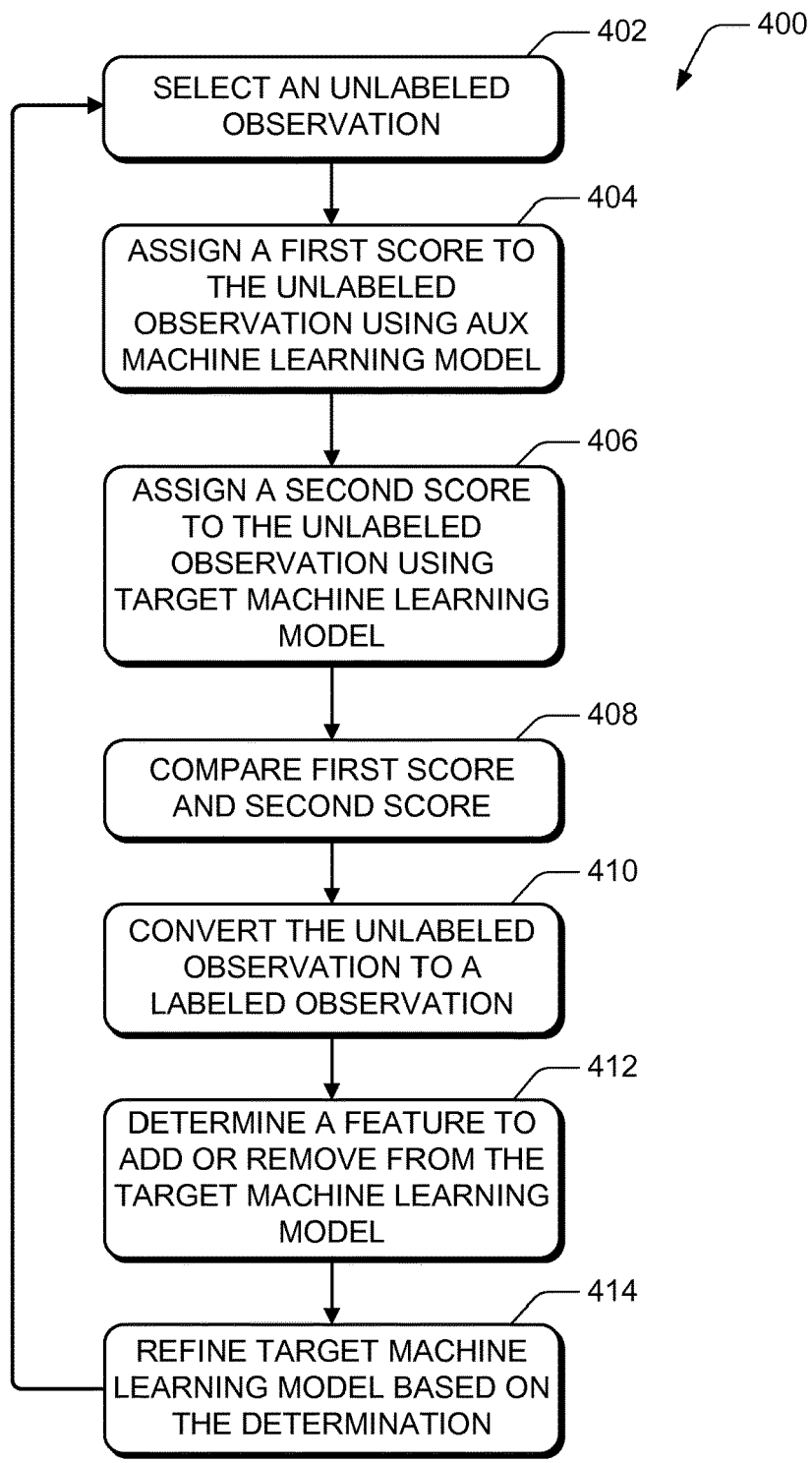
FIG. 4 is a flowchart showing aspects of one illustrative method for active machine learning including consideration of output from both an auxiliary machine learning model and a target machine learning model as described herein.

FIG. 3 is a flowchart showing aspects of one illustrative method 300 for active machine learning including selection of unlabeled observations having diversity, according to at least one example. The method 300 includes auxiliary machine learning model 112 selecting one or more sample unlabeled observations 116, at block 302.

The auxiliary machine learning model 112 can select the one or more sample unlabeled observations 116 such that the pools of labeled observations 106 are diverse. For example, sample unlabeled observations 116 can be selected by the auxiliary machine learning model 112 such that they are diverse across all selected unlabeled observations. In this manner, a higher quality training set of labeled observations 108 can be assembled.

The auxiliary machine learning model 112 can implement diversity in selection of the sample unlabeled observations 116 in a variety of manners. According to one example, the auxiliary machine learning model 112 can implement one or more functions, termed submodular functions, for the selection of a new sample unlabeled observation 116. According to another example, the auxiliary machine learning model 112 can determine a subset labelset, such as from labeled observations 132, wherein selection from that subset labelset provides an assurance of at least a minimal level of diversity. Both submodular functions for diversity and a threshold-based approach to determining the subset labelset are described more fully with reference to FIG. 5.

Turning back to FIG. 3, the labeling component 120 can convert the one or more sample unlabeled observations 116 to new labeled observations 124, at block 304. In some examples, the conversion can include the labeling component 120 selecting one or more sample unlabeled observations 116. Thereafter, the capacity-refining component 128 can refine the target machine learning model 114, at block 306. The auxiliary machine learning model 112 of the active machine learning system 110 can undergo retraining, at block 308. In some examples, the refining and retraining described in blocks 306 and 308 is substantially similar to the refining and retraining described above with reference to blocks 204 and 206, respectively. Thus, for the sake of brevity, similar details are omitted here.

As shown in FIG. 3, the method 300 can iterate through blocks 302-308 to incrementally refine the capacity of the target machine learning model 114 based on newly labeled observations being obtained during retraining of the auxiliary machine learning model 112. The newly labeled observations in this example can be based on a diverse set of unlabeled observations. Accordingly, the incremental refinement of the target machine learning model 114 can be based on a more diverse output from the auxiliary machine learning model 112, and less operations or iterations of refinement can be applicable as compared to conventional methods.

As briefly described above, the active machine learning system 110 can also operate as to allow the target machine learning model 114 to provide output for comparison, and further refinement of features contained therein. FIG. 4 is a flowchart showing aspects of one illustrative method 400 for active machine learning including consideration of output from both an auxiliary machine learning model and a target machine learning model, according to at least one example.

The method 400 includes the auxiliary machine learning model 112 selecting a sample unlabeled observation 116, at block 402. The particular unlabeled observation can be selected from the unlabeled observations 104, for example, because it is not known to which one of a plurality of classes the unlabeled observation belongs. F.

Thereafter, the method 400 includes assigning a first score to the unlabeled observation using the auxiliary machine learning model 112, at block 404. Furthermore, the method 400 can include assigning a second score to the unlabeled observation using the target machine learning model 114, at block 406.

The comparison component 118 compares the first score and the second score to determine a probability that the target machine learning model 114 has returned a false positive or a false negative result, at block 408. In some examples, the comparison component 118 compares the first score and the second score upon assignment of the first score and the second score by the auxiliary machine learning model 112 and the target machine learning model 114, respectively.

Generally, the comparing can include determining a magnitude of the difference between the first score and the second score. Thereafter, the comparison component 118 can determine that the target machine learning model 114 has returned a false positive when the magnitude is negative. Additionally, the comparison component 118 can determine that the target machine learning model 114 has returned a false negative when the magnitude is positive.

It should be understood that by identifying false positive and false negative results, a scope of the color-blindness of the target machine learning model 114 becomes apparent. For example, it may be relatively rare that the auxiliary machine learning model 112 and the target machine learning model 114 "disagree" and indicate false positives and false negatives. In these instances, the reason for the false positives or false negatives can provide valuable information as to the limitations or "color-blindness" of the limited capacity, target machine learning model 114. This information can be retained for use by the featuring component 122 and capacity-refining component 128 to achieve better accuracy through iterative refinement of the target machine learning model 114.

The labeling component 120 converts the unlabeled observation 116 to a new labeled observation 124 based at least on the probability, at block 410. In some examples, the labeling component 120 performs the conversion upon the comparison component 118 determining the probability of the false positive or false negative. Accordingly, the new labeled observation 124 can represent an example that aids in closing the gap of color-blindness of the target machine learning model 114, at least partially.

Thereafter, from possible features 126 the featuring component 122 can determine features 130 to add or remove from the target machine learning model 114, at block 412. The possible features 126 can be tailored based on the comparison of block 408 and 410, and therefore can also aid in closing the gap of color-blindness exposed through the comparison of both outputs. The capacity-refining component 128 can subsequently refine the target machine learning model 114 based features 130, at block 414.

Incremental refining of a capacity of the target machine learning model 114 can include both implementation of diversity in selection of unlabeled observations 116 and comparison of outputs from both the auxiliary machine learning model 112 and the target machine learning model 114 to aid in determining how to correct color-blindness. It should be understood that each of the methodologies described above can be modified to include both of these concepts at any level of granularity. For example, the selection diversity from method 300 can be implemented in one or both of the methods 200 and 400. Similarly, determination of disagreement between the auxiliary machine learning model 112 and the target machine learning model 114 of method 400 can be implemented in one or both of the methods 200 and 300. Along these lines, example individual details related to implementation of selection diversity in any of the above methods are described with reference to FIG. 5.

Figure 5:
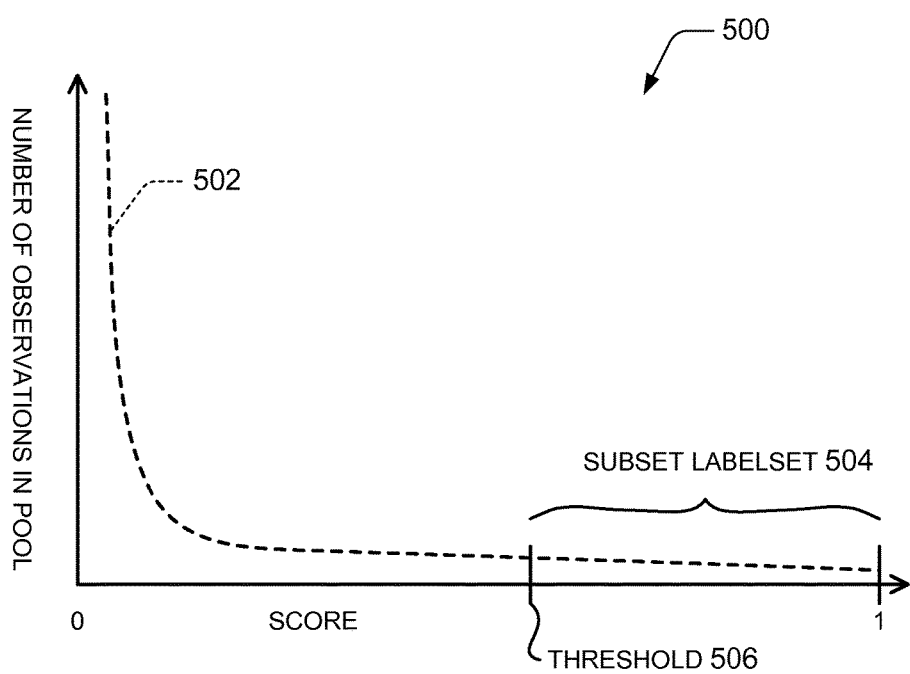
FIG. 5 illustrates a graph depicting output scores of example auxiliary machine learning models and an associated subset labelset for implementing diversity in unlabeled observation selection as described herein.

FIG. 5 illustrates a graph of an example curvature 502 depicting output scores of one or more auxiliary machine learning models and an associated subset labelset 504 for implementing diversity in unlabeled observation selection, according to at least one example. The curvature 502 represents an output of the auxiliary machine learning model 112 based on a pool or pools of observations such as pools 102 and/or 106.

As shown in FIG. 5, the y-axis of the curvature 502 represents a number of observations in a pool of observations. For example the pool of observations related to selection diversity are generally understood to be unlabeled observations, such as unlabeled observations 104. However, selection of a diverse training set including labeled observations 108 is also applicable in some examples. The x-axis of the curvature 502 generally represents a score output from the auxiliary machine learning model 112. The score can be a score normalized between 0 and 1, for example.

As further shown in the example of FIG. 5, as the number of observations increases, the score decreases. Additionally, as the number of observations decreases (or if only a diverse selection of observations is made), the score increases. Thus, a subset labelset of unlabeled observations can be identified for the particular pool or pools of observations. Thereafter, the auxiliary machine learning model 112 can be configured to select sample unlabeled observations only from the subset labelset to increase diversity in the unlabeled samples.

As mentioned briefly above, the subset labelset can be based on implementation of submodular functions or a threshold-based approach. Other examples are also possible.

Regarding the threshold-based approach, a threshold 506 can be chosen such that an expected score is 0.5 or greater. Thereafter, sampling is made only within the subset labelset, and samples are chosen uniformly. Upon receiving feedback of the actual scores for sampled unlabeled observations (e.g., through comparison component 118), the threshold can be calibrated automatically to maintain the expected score of 0.5 or greater. Accordingly, the threshold of 0.5 can automatically calibrate along the x-axis such that differing values of the threshold are possible.

Regarding implementation of submodular functions, the auxiliary machine learning model 112 is configured to select a set of unlabeled observations for subsequent labeling. In general, given a current classifier trained based on the auxiliary machine learning model 112, a subset of unlabeled items (U_f) is filtered. The subset U_f should be filtered to include equal numbers of both positive and negative observation results. Following filtering of the subset U_f, two submodular functions are defined. The first submodular function is for facility location, and is represented by Equation 1, below:

$$f(X)=\sum_{i \in U\_f} \max_{j \in X} s\_{ij} \qquad \text{Equation 1}$$

In Equation 1, $s\_{ij}$ is the similarity between observation i and observation j. The second submodular function is a feature-based function, and is represented by Equation 2, below:

$$f(X)=\sum_{f \in F} \log m\_f(X), \qquad \text{Equation 2}$$

In Equation 2, $m\_f(j)$=TF-IDF score of feature f in observation j.

A round of unlabeled observation selection includes solving an optimization problem represented by Equation 3, as set forth below:

$$\max_{X \subseteq U\_f, |X| \leq B} f(X \cup L) \qquad \text{Equation 3}$$

In at least one example every round of unlabeled observation selection includes solving an optimization problem represented by Equation 3. In some examples, at least one round of unlabeled observation selection is performed upon definition of the submodular functions. In Equation 3, L is the set of labeled observations. Thus, as described above, at least two manners of implementing diversity for selection of unlabeled observations have been presented herein. However, additional examples with differing solutions are also applicable.

It should be appreciated that the logical operations described above can be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, acts, or modules. These operations, acts and/or modules can be implemented in software, in firmware, in special purpose digital logic, in hardware, and any combination thereof. It should also be appreciated that more or fewer operations can be performed than shown in the figures and described herein. These operations can also be performed in a different order than those described herein.

Figure 6:
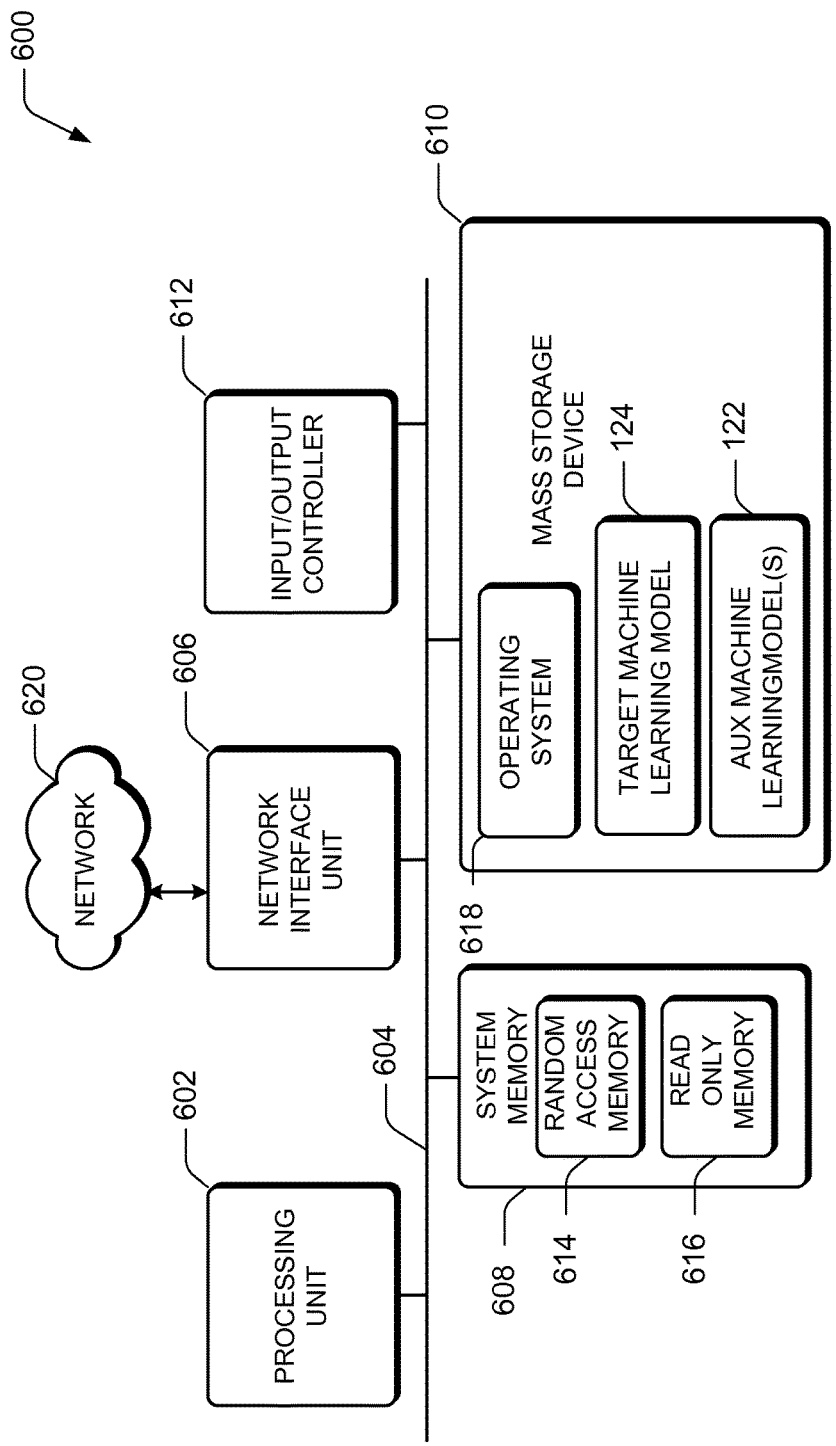
FIG. 6 is a computer architecture diagram showing an illustrative computer hardware and software architecture.

FIG. 6 shows an illustrative computer architecture for a computer 600 capable of executing the software components described herein for active machine learning in the manner presented above. The computer architecture shown in FIG. 6 illustrates an example computer system configuration, and the computer 600 can be utilized to execute any aspects of the components and/or modules presented herein described as executing on the active machine learning system 110 or any components in communication therewith.

The computer architecture shown in FIG. 6 includes a processing unit 602 (e.g., a central processing unit "CPU", a graphics processing unit "GPU", or other processing unit as described herein), a computer-readable media, which can include one or more of a system memory 608, including a random access memory 614 ("RAM") and a read-only memory ("ROM") 616, and a system bus 604 that couples the memory to the processing unit 602. A basic input/output system containing the basic routines that help to transfer information between elements within the computer 600, such as during startup, is stored in the ROM 616. The computer 600 further includes a mass storage device 610 for storing an operating system 618, application programs, and other program modules, which are described in greater detail herein.

The mass storage device 610 is connected to the processing unit 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can include any available computer storage media or communication media that can be accessed by the computer 600.

Communication media includes computer readable instructions, data structures, program modules, or other data in a modulated data signal such as a carrier wave. As used herein, the term "modulated data signal" means a signal that has one or more of its characteristics changed or set in a manner as to encode information in the signal. By way of example, and not limitation, physical components that enable operation of communication media include wired media such as a wired network or direct-wired connection, and wireless media such as acoustic, RF, infrared and other wireless media. Combinations of the any of the above should also be included within the scope of computer-readable media.

By way of example, and not limitation, computer storage media can include volatile and non-volatile, removable and non-removable media implemented in any method or technology for storage of information such as computer-executable instructions, data structures, program modules or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. As used herein, "computer storage media" does not include "communication media."

According to various examples, the computer 600 can operate in a networked environment using logical connections to remote computers through a network such as the network 620. The computer 600 can connect to the network 620 through a network interface unit 606 connected to the bus 604. It should be appreciated that the network interface unit 606 can also be utilized to connect to other types of networks and remote computer systems. The computer 600 can also include an input/output controller 612 for receiving and processing input from a number of other devices, including a keyboard, mouse, or electronic stylus, camera, touch interface, etc. Similarly, an input/output controller can provide output to a display screen, a printer, or other type of output device.

As mentioned briefly above, a number of program modules and data files can be stored in the mass storage device 610 and RAM 614 of the computer 600, including an operating system 618 suitable for controlling the operation of a networked desktop, laptop, or server computer. The mass storage device 610 and RAM 614 can also store one or more program modules, such as the auxiliary machine learning model 112, the target machine learning model 114, the comparison component 118, the labeling component 120, the featuring component 122, and/or the capacity-refining component 128, described above. The mass storage device 610 and the RAM 614 can also store other types of program modules, services, and data.

It should be appreciated that the software components described herein may, when loaded into the processing unit 602 and executed, transform the processing unit 602 and the overall computer architecture 600 from a general-purpose computing system into a special-purpose computing system customized to facilitate the functionality presented herein. The processing unit 602 may be constructed from any number of transistors or other discrete circuit elements, which may individually or collectively assume any number of states. More specifically, the processing unit 602 may operate as a finite-state machine, in response to executable instructions contained within the software modules disclosed herein. These computer-executable instructions may transform the processing unit 602 by specifying how the processing unit 602 transitions between states, thereby transforming the transistors or other discrete hardware elements constituting the processing unit 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media described herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this description.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture different than that shown in FIG. 6.

Example Clauses

A: A method comprising: initiating active machine learning through an active machine learning system configured to train an auxiliary machine learning model to produce at least one new labeled observation; refining a target machine learning model based at least on the active machine learning, wherein the target machine learning model includes a limited-capacity machine learning model; and retraining the auxiliary machine learning model with the at least one new labeled observation subsequent to refining the capacity of the target machine learning model.

B: A method as paragraph A recites, wherein the refining includes refining a capacity of the target machine learning model.

C: A method as either paragraph A or B recites, wherein the auxiliary machine learning model includes a capacity larger than the target machine learning model.

D: A method as any of paragraphs A-C recites, wherein the auxiliary machine learning model includes a semantic machine learning model.

E: A method as paragraph D recites, wherein the semantic machine learning model includes a bag-of-words machine learning model.

F: A method as any of paragraphs A-E recites, wherein initiating the active machine learning comprises: selecting one or more unlabeled observations from a pool of unlabeled observations.

G: A method as paragraph F recites, wherein the refining the capacity includes incrementally adding or removing features from the target machine learning model based on an output of the auxiliary machine learning model responsive to processing the one or more unlabeled observations.

H: A method as any of paragraphs A-G recites, wherein the refining the capacity includes incrementally adding or removing features from the target machine learning model based at least on the initiated active machine learning of the auxiliary machine learning model.

I: A method as any of paragraphs A-H recites, further comprising implementing diversity in the initiated active machine learning by at least one submodular function.

J: A method as any of paragraphs A-I recites, further comprising implementing diversity in the initiated active machine learning by establishing a subset labelset in a pool of unlabeled observations configured to provide diverse unlabeled observations from the subset labelset.

K: A method as paragraph J recites, further comprising selecting one or more unlabeled observations from the subset labelset for processing by the auxiliary machine learning model.

L: A method as any of paragraphs A-K recites, further comprising reducing a color-blindness of the target machine learning model based at least on disagreement between the auxiliary machine learning model and the target machine learning model.

M: A computer-readable medium including computer-executable instructions for performing a method as any of paragraphs A-L recite.

N: A computer comprising: a processing unit; and a computer-readable medium including computer-executable instructions for performing a method as any of paragraphs A-L recite.

O: A system comprising: means for processing; means for initiating active machine learning through an active machine learning system configured to train an auxiliary machine learning model to produce at least one new labeled observation; means for refining a target machine learning model based at least on the active machine learning, wherein the target machine learning model includes a limited-capacity machine learning model; and means for retraining the auxiliary machine learning model with the at least one new labeled observation subsequent to refining the capacity of the target machine learning model.

P: A system as paragraph O recites, wherein the means for refining includes means for refining a capacity of the target machine learning model.

Q: A system as either paragraph O or P recites, wherein the auxiliary machine learning model includes a capacity larger than the target machine learning model.

R: A system as any of paragraphs O-Q recites, wherein the auxiliary machine learning model includes a semantic machine learning model.

S: A system as paragraph R recites, wherein the semantic machine learning model includes a bag-of-words machine learning model.

T: A system as any of paragraphs O-S recites, wherein the means for initiating the active machine learning comprises: means for selecting one or more unlabeled observations from a pool of unlabeled observations.

U: A system as paragraph T recites, wherein the means for refining the capacity includes means for incrementally adding or removing features from the target machine learning model based on an output of the auxiliary machine learning model responsive to processing the one or more unlabeled observations.

V: A system as any of paragraphs O-U recites, wherein the means for refining the capacity includes means for incrementally adding or removing features from the target machine learning model based at least on the initiated active machine learning of the auxiliary machine learning model.

W: A system as any of paragraphs O-V recites, further comprising means for implementing diversity in the initiated active machine learning by at least one submodular function.

X: A system as any of paragraphs O-W recites, further comprising means for implementing diversity in the initiated active machine learning by establishing a subset labelset in a pool of unlabeled observations configured to provide diverse unlabeled observations from the subset labelset.

Y: A system as paragraph X recites, further comprising means for selecting one or more unlabeled observations from the subset labelset for processing by the auxiliary machine learning model.

Z: A system as any of paragraphs O-Y recites, further comprising means for reducing a color-blindness of the target machine learning model based at least on disagreement between the auxiliary machine learning model and the target machine learning model.

AA: A computer-readable medium having computer-executable instructions thereupon that, when executed by a computer, cause the computer to perform operations comprising: selecting an unlabeled observation from a pool of unlabeled observations through an auxiliary machine learning model, wherein it is not known to which one of a plurality of classes the unlabeled observation belongs; converting the unlabeled observation to a new labeled observation based on an output of the auxiliary machine learning model responsive to the unlabeled observation; refining a capacity of a target machine learning model based on the converting, wherein the target machine learning model is a limited-capacity machine learning model; and retraining the auxiliary machine learning model with the new labeled observation subsequent to refining the capacity of the target machine learning model.

AB: A computer-readable medium as paragraph AA recites, wherein the refining the capacity includes: incrementally adding at least one feature to the target machine learning model based on features contained within the new labeled observation; and incrementally removing at least one feature from the target machine learning model based on the features contained within the new labeled observation.

AC: A computer-readable medium as either paragraph AA or AB recites, wherein the selecting the unlabeled observation includes selecting the unlabeled observations based at least on optimization of at least one submodular function.

AD: A computer-readable medium as any of paragraphs AA-AC recites, wherein the selecting the unlabeled observation includes selecting the unlabeled observations from a subset labelset in the pool of unlabeled observations, the subset labelset configured to provide diverse unlabeled observations.

AE: A computer-readable medium as any of paragraphs AA-AD recites, wherein the refining the capacity of the target machine learning model includes reducing a color-blindness of the target machine learning model based at least on disagreement between the auxiliary machine learning model and the target machine learning model.

AF: A computer comprising: a processing unit; and a computer-readable medium as any of paragraphs AA-AE recites.

AG: A system comprising: an auxiliary machine learning model configured to assign a first score to an unlabeled observation; a target machine learning model configured to assign a second score to the unlabeled observation, wherein the target machine learning model and the auxiliary machine learning model are from different machine learning model classes, and wherein the target machine learning model is a limited-capacity machine learning model; a comparison component configured to compare the first score and the second score to determine a probability that the target machine learning model has returned a false positive or a false negative result; and a featuring component configured to receive the output of the comparison component.

AH: A system as paragraph AG recites, wherein the comparison component configured to compare the first score and the second score is further configured to perform comparison comprising: determining a magnitude of the difference between the first score and the second score; determining that the target machine learning model has returned a false positive when the magnitude is negative; and determining that the target machine learning model has returned a false negative when the magnitude is positive.

AI: A system as either paragraph AG or AH recites, further comprising a capacity-refining component in operative communication with the featuring component, the capacity-refining component configured to: extend a scope of the target machine learning model to include a new feature previously not within the scope of the target machine learning model when the target machine learning model has returned a false positive.

AJ: A system as any of paragraphs AG-AI recites, further comprising a capacity-refining component in operative communication with the featuring component, the capacity-refining component configured to: narrow a scope of the target machine learning model to remove a feature previously within the scope of the target machine learning model when the target machine learning model has returned a false positive.

CONCLUSION

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

All of the methods and processes described above can be embodied in, and fully automated via, software code modules executed by one or more general purpose computers or processors. The code modules can be stored in any type of computer-readable storage medium or other computer storage device. Some or all of the methods can alternatively be embodied in specialized computer hardware.

Conditional language such as, among others, "can," "could," "can" or "can," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:
1. A method comprising:
 initiating active machine learning through an active machine learning system configured to train an auxiliary machine learning model;
 evaluating an unlabeled observation using the auxiliary machine learning model to generate a first score;

evaluating the unlabeled observation using a target machine learning model to generate a second score;

comparing the first score to the second score to calculate a magnitude of a difference between the first score and the second score;

identifying a machine learning feature using the magnitude;

updating the target machine learning model based at least on a refinement using the machine learning feature, wherein the target machine learning model includes a limited-capacity machine learning model;

retraining the auxiliary machine learning model with at least one new labeled observation subsequent to updating the target machine learning model, wherein the retrained version of the auxiliary machine learning model produces the at least one new labeled observation using the machine learning feature from the unlabeled observation subsequent to refining the capacity of the target machine learning model; and providing the updated target machine learning model to a computing device capable of computation of device labels using the updated target machine learning model.

2. A method as claim 1 recites, wherein the auxiliary machine learning model includes a capacity larger than the target machine learning model.

3. A method as claim 1 recites, wherein the auxiliary machine learning model includes a semantic machine learning model.

4. A method as claim 3 recites, wherein the semantic machine learning model includes a bag-of-words machine learning model.

5. A method as claim 1 recites, wherein initiating the active machine learning comprises: selecting one or more unlabeled observations from a pool of unlabeled observations.

6. A method as claim 5 recites, wherein the refining the capacity includes incrementally adding or removing features from the target machine learning model based on an output of the auxiliary machine learning model responsive to processing the one or more unlabeled observations.

7. A method as claim 1 recites, wherein the refining the capacity includes incrementally adding or removing features from the target machine learning model based at least on the initiated active machine learning of the auxiliary machine learning model.

8. A method as claim 1 recites, further comprising implementing diversity in the initiated active machine learning by at least one submodular function.

9. A method as claim 1 recites, further comprising implementing diversity in the initiated active machine learning by establishing a subset labelset in a pool of unlabeled observations configured to provide diverse unlabeled observations from the subset labelset.

10. A method as claim 9 recites, further comprising selecting one or more unlabeled observations from the subset labelset for processing by the auxiliary machine learning model.

11. A method as claim 1 recites, further comprising reducing a color-blindness of the target machine learning model based at least on disagreement between the auxiliary machine learning model and the target machine learning model.

12. A non-transitory computer-readable medium having computer-executable instructions thereupon that, when executed by a computer, cause the computer to perform operations comprising:

selecting an unlabeled observation from a pool of unlabeled observations through an auxiliary machine learning model, wherein it is not known to which one of a plurality of classes the unlabeled observation belongs;

evaluating the unlabeled observation using an auxiliary machine learning model to generate a first score;

evaluating the unlabeled observation using a target machine learning model to generate a second score;

comparing the first score to the second score to calculate a magnitude of a difference between the first score and the second score;

identifying a machine learning feature using the magnitude;

updating the target machine learning model based on a refinement using the machine learning feature, wherein the target machine learning model is a limited-capacity machine learning model;

retraining the auxiliary machine learning model with at least one new labeled observation subsequent to updating the target machine learning model, wherein the retrained version of the auxiliary machine learning model produces the at least one new labeled observation using the machine learning feature from the unlabeled observation subsequent to refining the capacity of the target machine learning model; and providing the updated target machine learning model to a computing device capable of computation of device labels using the updated target machine learning model.

13. A computer-readable medium as claim 12 recites, wherein the refining the capacity includes:

incrementally adding at least one feature to the target machine learning model based on features contained within the new labeled observation; and incrementally removing at least one feature from the target machine learning model based on the features contained within the new labeled observation.

14. A computer-readable medium as claim 12 recites, wherein the selecting the unlabeled observation includes selecting the unlabeled observations based at least on optimization of at least one submodular function.

15. A computer-readable medium as claim 12 recites, wherein the selecting the unlabeled observation includes selecting the unlabeled observations from a subset labelset in the pool of unlabeled observations, the subset labelset configured to provide diverse unlabeled observations.

16. A computer-readable medium as claim 12 recites, wherein the refining the capacity of the target machine learning model includes reducing a color-blindness of the target machine learning model based at least on disagreement between the auxiliary machine learning model and the target machine learning model.

17. An active machine learning system, the system comprising:

at least one processor; and memory including instructions that, when executed by the at least one processor, cause the at least one processor to perform operations to:

assign a first score to an unlabeled observation using an auxiliary machine learning model;

assign a second score to the unlabeled observation using a target machine learning model, wherein the target machine learning model and the auxiliary machine learning model are from different machine learning model classes, and wherein the target machine learning model is a limited-capacity machine learning model;

compare the first score and the second score to calculate a magnitude of a difference between the first score and the second score;

identify a machine learning feature using the magnitude;

update the target machine learning model based at least on a refinement using the machine learning feature;

retrain the auxiliary machine learning model with at least one new labeled observation subsequent to the update of the target machine learning model, wherein the retrained version of the auxiliary machine learning model produces the at least one new labeled observation using the machine learning feature from the unlabeled observation subsequent to refining the capacity of the target machine learning model; and provide the updated target machine learning model to a computing device capable of computation of device labels using the updated target machine learning model.

18. A system as claim 17 recites, wherein the instructions to compare the first score and the second score further comprises instructions to:

determining that the target machine learning model has returned a false positive when the magnitude is negative; and determining that the target machine learning model has returned a false negative when the magnitude is positive.

19. A system as claim 18 recites, further comprising instructions to:

extend a scope of the target machine learning model to include a new feature previously not within the scope of the target machine learning model when the target machine learning model has returned a false positive.

20. A system as claim 18 recites, further comprising instructions to:

narrow a scope of the target machine learning model to remove a feature previously within the scope of the target machine learning model when the target machine learning model has returned a false positive.

* * * * *